Patented Oct. 23, 1945

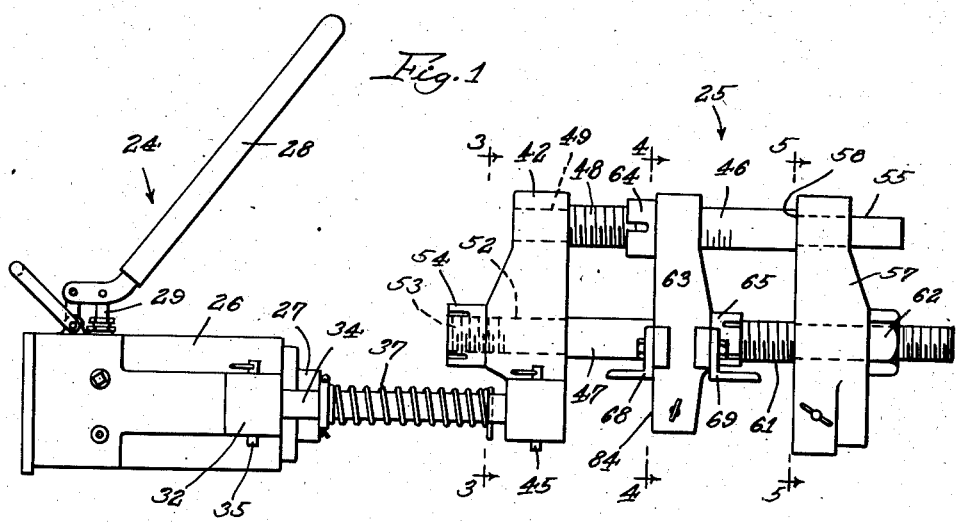

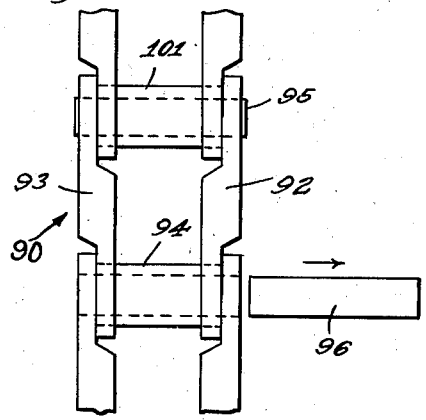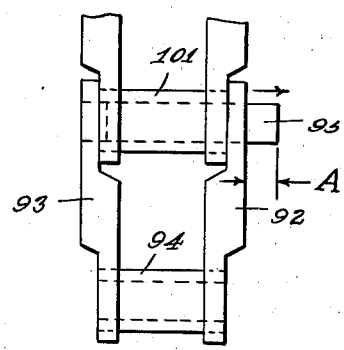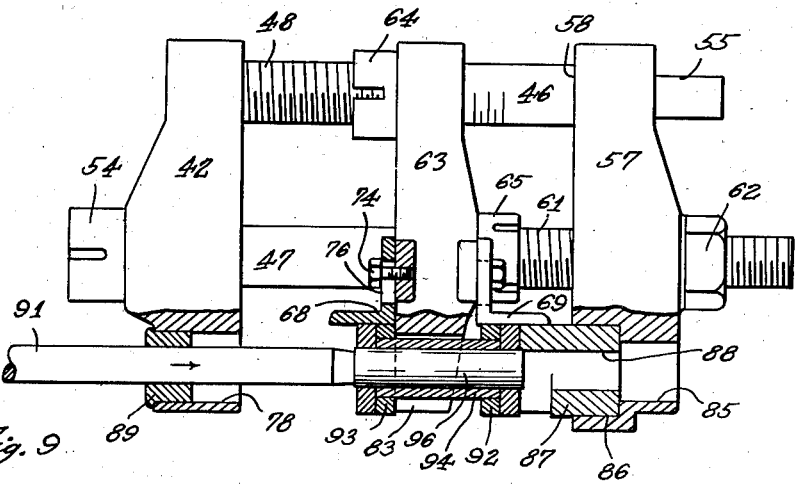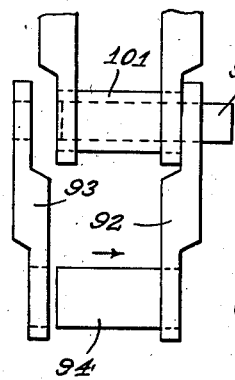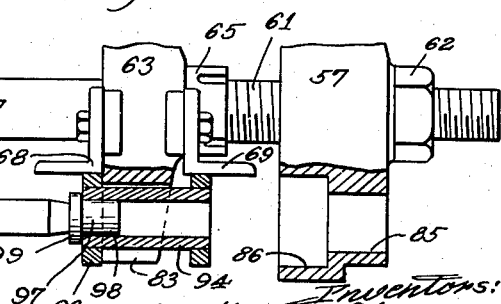

2,387,551

UNITED STATES PATENT OFFICE 2,387,551

APPARATUS FOR DISASSEMBLING AND REASSEMBLING TRACKS

John Herbert Abramson and Edwin C. Swanson, Rockford, Ill., assignors to Greenlee Bros. & Co., Rockford, Ill., a corporation of Illinois Application October 20, 1941, Serial No. 415,678

10 Claims. (Cl. 59—7)

This invention relates to machines for disassembling and reassembling tracks of the type used on track-type tractors and the like, and has special reference to novel means for holding the elements of the truck and for applying pressure to remove and install press fit pins and bushings thereof holding the track in assembled relationship.

A matter of considerable difficulty in the repair of tracks of the so-called crawler type such as used on track type tractors and other similar machines, is that of removing the pins and sleeves. These elements are inserted into the links of the tracks under extremely high pressure by means of heavy machinery in the manufacturing plant, and consequently are difficult to remove by ordinary equipment found in the field. Furthermore, it is these elements of the track which are most subject to wear and which commonly need replacement.

An important object of the invention is the provision of a device for removing the pins and bushings from crawler type tracks having a novel and improved form of head wherein means are provided for supporting both side lengths of the track against the pushing force, and for maintaining the pins and bushings in alignment with the push rod.

Another object is the provision in a device of the character described of a head constructed for adjustment to fit standard sizes of tracks and for maintaining the parts in rigid position in all adjusted positions, and wherein the parts are arranged in a novel and effective manner.

A still further object of the invention is the provision of an adjustable head and the combination therewith of novel pushing and guiding members to maintain true alignment of the parts during the pin and bushing pushing operations.

Other objects and advantages will appear to those skilled in the art from the following description and the accompanying drawings, in which—

Figure 1 is a side elevational view of a pin and bushing pushing device embodying the invention;

Fig. 2 is a top view thereof;

Figs. 3, 4 and 5 are views substantially on the lines 3—3, 4—4 and 5—5, respectively, of Figure 1;

Fig. 6 is a fragmentary view of a track chain showing the first step of disassembling the same;

Fig. 7 is a fragmentary view of a track chain showing the second step in the disassembling operation;

Fig. 8 is a fragmentary side view partly in section showing the head and the manner of accomplishing the steps of Figs. 6 and 7.

Fig. 9 is a fragmentary view of a track chain showing the third step in disassembling the same;

Fig. 10 is a fragmentary view of the head showing the manner in which this step is conducted.

The present embodiment of the invention includes a power unit designated generally by the numeral 24 and a head indicated by the numeral 25 (Figs. 1 and 2). The power unit is made substantially in accordance with the teachings of Abramson and Swanson Patent 1,986,493, issued January 1, 1935, and includes a body member 26 having a piston 27 positioned therein adapted to be hydraulically projected by reciprocation of handles 28 which function to actuate injector pumps 29 for the purpose of injecting fluid behind the piston 27 to urge it outwardly in an operating stroke. The body 26 is arranged so as to be capable of resting along its lower side on a floor or other ordinary means of support. The body has ears as indicated at 31 and 32 at opposite sides thereof for the reception of connecting bars indicated generally by the numerals 33 and 34 secured in the body by means of pins as indicated at 35. Surrounding the connecting bars 33 and 34 are springs 36 and 37 abutting at one end against pins 38 and 39 on the connecting bars and at the opposite ends bearing against a spring compression bar 41 which has loose fit on the connecting bars and extends therebetween and across the forward end of the piston 27, the springs being compressed by the bar 41 as it moves along the connecting bars with outward movement of the piston and serving to return the piston to its position within the body 26 when pressure is relieved from the fluid behind the piston so as to re-position the parts for a subsequent stroke of the piston. Positioned on the forward ends of the connecting bars 33 and 34 is a cross member generally designated by the numeral 42 (note particularly Figs. 1 to 3). This cross member is of heavy cast section so as to be substantially rigid under the conditions of operation of the machine and so as to prevent flexing of the other parts of the head under the pushing force. The head is formed in the general shape of an inverted T and has openings 43 and 44 for the passage of the connecting bars 33 and 34, the connecting bars being secured therein by pins 45. Preferably the connecting bars should have a snug fit within the openings 43 and 44 so as to prevent relative movement under the action of the piston 27, as will presently be described. Carried on the cross member 42 in superimposed spaced relationship are upper and lower head bars 46 and 47 of such size and material as to withstand the pressing force with a minimum of deflection. The upper head bar 46 is provided with a central portion threaded as shown at 48 adjacent one end, this end of the bar having a portion of reduced diameter 49 snugly receivable in an opening 51 (Fig. 3) in the upper end of the cross member 42, a shoulder between these two portions of the bar resting against the front face of the cross member. The lower head bar 47 likewise has a portion 52 of smaller cross section than the central portion of the bar which extends through and snugly fits within a lower opening in the cross member, as best shown in Fig. 3, the bar having a shoulder abutting against the face of the cross member to limit the position of the bar. The end of the bar is threaded as shown at 53 and receives a nut 54 to draw the shoulder against the face of the cross member, as will be apparent from Figure 1. The opposite end of the upper head bar 46 has an end portion 55 of smaller cross-section than the central portion of the bar which is received in an opening 56 of a support arm 57, the head bar having a shoulder 58 against which one side of the support arm abuts to locate the same. The lower head bar 47 likewise passes through an opening 59 in the support arm 57 and is threaded through a substantial portion of its length as shown at 61, the head bar carrying a nut 62 threaded thereon which urges the support arm 57 into abutting relation with the shoulder 58 in its normal operation. However, the head bars 46 and 47 normally project outwardly somewhat beyond the support arm 57 as shown in Figs. 1 and 2 so that the nut 62 may be backed away and the space between the cross member 42 and the support arm 57 increased beyond the normal spacing thereof to accommodate for extremely large tracks.

Carried on the head bars 46 and 47 is a second support arm designated generally by the numeral 63, this support arm being slidable on the head bars between adjusted positions as dictated by the size of the track and the spacing between the side links of the track. The support arm 63 is held in its adjusted positions by means of nuts 64 and 65 positioned on the threaded portions 48 and 61 of the head bars 46 and 47. Thus by backing the nut 64 away from the support arm 63 and then advancing the nut 65, the support arm may be moved toward the left facing Figs. 1 and 2 to various adjusted positions, and by reversing the process it may be moved toward the right in a similar manner. The support arm 63 is provided with openings 66 and 67 through which the head bars 46 and 47 pass, as will be seen from Fig. 4. Positioned on the support arm 63 are support angles 68 and 69 in the form of right angled angle iron members, each having a lower flange 71 (Fig. 4) and upstanding flange portions 72 and 73 disposed against the side of the support arm and secured thereto by cap screws 74 and 75 passing through slots 76 and 77, the slots permitting of adjustment of the elevation of the support angle with respect to the support arm, as will be apparent from Figs. 4 and 8 to thereby locate the pins and bushings and align the same with respect to the head.

The cross member 42 is provided with an opening 78 intermediate the openings 43 and 44, and the support arm 57 is provided with an opening 79 disposed below the openings 56 and 59 and substantially coaxial with respect to the opening 78 of the cross member, and the support arm 63 is likewise provided with an opening 81 comprising in this instance a portion of a cylindrical surface, the axis of curvature being substantially coincident with the axis of the opening 78. The opening 81 of the support arm 63 is adapted to receive the pin or bushing of a track as shown in Fig. 8 so that the portions of the support arm at opposite sides of the opening 81, indicated at 82 and 83, project down on opposite sides of the bushing whereby the forward face 84 of the support arm is brought into contact with a side link of a chain when the head is disposed across the chain as indicated in Fig. 8, the purpose of this construction being to support one side link of the chain against the pin pressing force, as will presently be described. The support arm 57 has shape characteristics for supporting any of a plurality of sleeves of different sizes and for this purpose the opening 79 in the support arm 57 takes the form shown in Fig. 8 and includes a central bore 85 and a counterbore 86, the bore 85 serving for the passage of a pin or bushing as it is forced from the track. Disposed in the counterbore 86 is a pin sleeve 87 shaped for reception in the counterbore 86 and adapted to project outwardly from the face of the support arm 57 as shown in Fig. 8, the outwardly disposed end of the pin sleeve being adapted to rest against the outer side of a side link of the chain to support the opposite side link against the pushing force. Normally a plurality of such sleeves are provided with the device, the sleeves being of different sizes to fit tracks of different size. The pin sleeve is provided with an opening as shown at 88 for the passage of the pin out of the track, as will presently be described. The opening 78 in the cross member 42 normally carries a bushing 89 for the support and guidance of a push rod 91 passing therethrough and into contact with the end of a track pin or bushing as shown in Fig. 8. The push rod 91 is disposed between the connecting bars 33 and 34 and engages the end of the piston 27 in such manner that upon projection of the piston the push rod is moved through the bushing 89 to exert a pushing force on a pin or bushing.

Referring now more particularly to Figs. 6, 7 and 8, the numeral 90 designates generally a track chain of the type herein contemplated including a plurality of chain links comprising side links 92 and 93, the side links being interconnected at one end by a bushing 94 having press fit into openings in the ends of the side links, the opposite ends of the side links being interconnected by a pin 95 which extends through the bushing of the next adjacent link and has a press fit in openings in the ends of side links 92 and 93. From this construction it will be seen that the pins and bushings constitute the bearing members of the track chain. Referring now more particularly to Fig. 8, it will be seen that the head is adjustable to fit tracks of many different sizes and in removing the pins and bushings from a track, the head is placed over a track as shown in this figure with the pin sleeve 87 contacting the side link 92. The support arm 63 is then adjusted to bring the fingers 82 and 83 into contact with the inner side of the side link 93 so that the pin sleeve and the support arm serve to support the side links 92 and 93 against force exerted to the right facing Fig. 8, the opening 88 in the pin sleeve providing space for the passage of the pin 95. The support angles 68 and 69 are adjusted in their elevational position so that the bottom flanges 71 rest on the edges of the side links 92 and 93, bringing the pin 95 into axial alignment with the openings 78 and 85 and with the push rod 91, the screws 74 and 75 being set to retain the support angles in this position. When so adjusted the parts are arranged to retain the track in alignment for all operations of disassembling and assembling the track.

In repairing a track chain the track is first removed from the tractor or other machine by breaking the track which is accomplished in most cases by the removal of a track link master pin, that is, a pin which is held in position by means other than a friction fit in the links of the track and which can be conveniently manually removed. The track is then broken into lengths of convenient size in the manner shown in Fig. 6, that is, by pushing a track pin such as indicated at 96 completely through both side links of the track chain. This is accomplished by placing the head over the track in the manner shown in Fig. 8 and reciprocating the levers 28 to project the piston 27 and move the push rod 91, which forces the pin 96 through the bushing and through the side links to the position shown in Figure 6, the pin passing out through the central opening 88 and through the opening 85. In this manner the track is broken into several sections or a section requiring repair is removed from the main body of the track.

In disassembling tracks it is also frequently necessary to push the pins out of the side links and this may be accomplished with our device in the manner shown in Fig. 8. The head is moved along the track to successive pins and at each pin the parts are brought into the position shown in Fig. 8, the push rod 91 being moved until the end of the pin adjacent the push rod is moved to a point beyond the adjacent side link, that is, until one end is pressed out of the link in which it has a friction fit and into the bushing as shown in Fig. 7. This operation is conducted on successive pins of the track section under consideration until all of the pins occupy the position shown in Fig. 7. It will be seen that during this operation the pin sleeve 87 and the support arm 63 support each of the side links against the force applied to the pin. This support prevents the links from being permanently bent or distorted by the present operation, and of equal importance prevents the links from being sprung during the pressing operations so as to produce a misalignment as between the pin and the opening in the links. Such misalignment caused by springing of the side links tends to bind the pin in the opening and thus wear or shear part of the metal either from the pin or from the periphery of the opening which damages the parts and impairs the life thereof. By holding the two sides and links in the manner described, the openings in the pins are constantly held in alignment so that this shearing action cannot occur.

The device may also be used for removing the bushings from the links in the manner shown in Figs. 9 and 10. In this instance the pin sleeve 87 is removed from the counterbore 86 and a push plug 97 is inserted in the end of the bushing 94 adjacent the end of the plunger 91. This push plug has a central body portion 98 receivable within the bushing and a head or shoulder 99 adapted to seat against the end of the bushing, the head being smaller than the outside diameter of the bushing. It will be seen that when the plunger 91 is moved in the direction of the arrow, the bushing will be forced in the same direction while the side link 93 will be restrained against motion by action of the fingers 82 and 83, the result being that the end of the bushing will be forced out of the opening in the link 93. It will be seen that in this instance the support angles 68 and 69 maintain the parts in alignment and the plane face of the support arm 63 abutting against the side of the side link 93 prevents misalignment of the bushing and the side link during the pushing operations. The result of this operation is shown in Fig. 9, the side link 93 being separated from the chain. Since the pin 95 is movable with respect to the bushing 101 of the next track link, the side link 92 can now be removed from the chain by sliding the link 92 to the right facing Fig. 9. This operation is repeated on successive bushings throughout the section being dismantled so that the track links are broken into two parts, the side link 92 carrying the pin 95 and the bushing 94 and the side link 93.

An advantage of our construction is that the position of the head with respect to the power unit may be reversed by withdrawing the connecting bars 33 and 34 from the openings 43 and 44 and turning the head over so that the upper head bar 46 is disposed below the lower head bar 47 and reinserting the connecting bars in this position. With the parts in the reverse position, the elements of the chain are more readily visible and can be inserted and removed with greater convenience, which is of particular convenience in the removal of the bushings from the side links 92. By suitable adjustments our device may be utilized to advantage in completely disassembling and reassembling crawler type tracks. The device is small, compact, and may be transported from place to place with relative ease. It is, however, capable of applying sufficient power for use with the largest type of tracks.

Attention is directed to the fact that the device may be adjusted to fit any conventional size of crawler type track and that these adjustments are easily and conveniently made, and to the fact that in spite of the adjustable nature of the parts, the supporting arms 57 and 63 are rigidly held in position to prevent misalignment of the bushings, pins and side links during the assembling and disassembling operations.

We claim:

1. The combination in a device for pressing the pins and bushings of crawler type track chains having a power unit for exerting a pressing force against the pins and bushings, of a head comprising a head member arranged for disposition on the side of said chain adjacent said power unit, said power unit having means for attachment to said head member, a fixed support arm disposed on the opposite side of said chain to hold a side link of said chain during a pressing stroke, spaced upper and lower head bars extending transversely of said track and rigidly connecting said member and said support arm, a movable support arm carried on said head bars and disposed for reception between the side links of said chain to hold the other side link of said chain during said pressing stroke, and means for securing said movable arm in any of a plurality of adjusted positions with respect to said fixed arm, dependent upon the spacing of the side links of said chain to bring said arms into supporting relationship with said side links.

2. The combination in a device for pressing the pins and bushings of crawler type track chains having a power unit for exerting a pressing force against the pins and bushings, of a head comprising a head member arranged for disposition on the side of said chain adjacent said power unit, said power unit having means for attachment to said head member, a fixed support arm disposed on the opposite side of said chain, a sleeve supported on said fixed support arm, shaped and positioned to bear against said chain to hold a side link of said chain during a pressing stroke, said fixed support arm having shape characteristics for supporting any of a plurality of sleeves of different sizes dependent upon the size of said chain, spaced upper and lower head bars extending transversely of said track and rigidly connecting said member and said support arm, a movable support arm carried on said head bars and disposed for reception between the side links of said chain to hold the other side link of said chain during said pressing stroke, and means for securing said movable arm in any of a plurality of adjusted positions with respect to said fixed arm dependent upon the spacing of the side links of said chain, to bring said movable arm and said sleeve into abutting relationship with said side links.

3. The combination in a device for pressing the pins and bushings of crawler type track chains having a power unit for exerting a pressing force against the pins and bushings, of a head comprising a head member arranged for disposition on the side of said chain adjacent said power unit, said power unit having means for attachment to said head member, a fixed support arm disposed on the opposite side of said chain, a sleeve supported on said fixed support arm, shaped and positioned to bear against said chain to hold a side link of said chain during a pressing stroke, said fixed support arm having shape characteristics for supporting any of a plurality of sleeves of different sizes dependent upon the size of said chain, spaced upper and lower head bars extending transversely of said track and rigidly connecting said member and said support arm, a movable support arm carried on said head bars and disposed for reception between the side links of said chain to hold the other side link of said chain during said pressing stroke, said movable arm and said sleeve having aligned openings, means for locating the pins and bushings of said chain in the opening of said movable arm to align the same with respect to said head, and means for securing said movable arm in any of a plurality of adjusted positions with respect to said fixed arm dependent upon the spacing of the side links of said chain to bring said movable arm and said sleeve into abutting relationship with said side links.

4. The combination in a device for pressing the pins and bushings of crawler type track chains having a power unit for exerting a pressing force against the pins and bushings, of a head comprising a head member arranged for disposition on the side of said chain adjacent said power unit, said power unit having means for attachment to said head member, a fixed support arm disposed on the opposite side of said chain to hold a side link of said chain during a pressing stroke, spaced upper and lower head bars extending transversely of said track and rigidly connecting said member and said support arm, said bars being threaded intermediate their ends, a movable support arm carried on said head bars and disposed for reception between the side links of said chain to hold the other side link of said chain during the pressing stroke, and nuts on the threaded portions of said head bars for securing said movable arm in any of a plurality of adjusted positions with respect to said fixed arm dependent upon the spacing of the side links of said chain to bring said arms into supporting relationship with said links.

5. The combination recited in claim 1 wherein said fixed support arm is normally spaced from the adjacent side link and wherein a sleeve is seated in said fixed support arm shaped to fit against the adjacent side of said chain to hold the same against the pressing force applied thereto.

6. The combination recited in claim 1 wherein said support arms are provided with aligned openings for the passage of said bushings and pins, means are provided on said movable arm shaped and positioned to bear against said track to locate said openings, said pins and bushings, and said links in registration and alignment.

7. The combination in a device for pressing pins and bushings in crawler type track chains, of a power unit having a push rod adapted to be positioned in end to end relationship with the pins or bushings of said track to exert a pressing force thereagainst and move the same longitudinally with respect to the track for disassembling and assembling the same, a head including a head member arranged to be disposed on the side of said chain adjacent said power unit having an opening for the passage of said push rod, said power unit having means for attachment to said head member, a fixed support arm disposed on the opposite side of said chain to hold a side link of said chain against movement during a pressing stroke, spaced upper and lower head bars extending transversely of said chain and rigidly connecting said member and said arm, a movable support arm carried on said head bars and disposed for reception between the side links of said chain to hold the other side link of said chain during said pressing stroke, said arms having openings coaxial with the opening in said head member, means for securing said movable arm in any of a plurality of adjusted positions with respect to said fixed arm dependent upon the spacing of the side links of said chain to bring said arms into supporting relationship with said side links, and means on said movable support arm for locating said head to bring said openings in axial alignment with said pins and bushings and for locating said links with respect to said pins and bushings, said means being adjustable to fit track chains of different sizes.

8. The combination recited in claim 7 wherein the opening in said head member is of substantially larger diameter than said push rod, and a bushing is disposed within the opening around the push rod whereby different combinations of push rods and bushings of differing sizes may be employed for different sized tracks.

9. The combination in a device for pressing pins and bushings in crawler type track chains, of a power unit having a push rod adapted to be positioned in end to end relationship with the pins or bushings of said track to exert a pressing force thereagainst and move the same longitudinally with respect to the track for disassembling and assembling the same, and having spaced connecting bars disposed in parallelism beside said push rod, a head comprising a head member attached to said connecting bars, said head member having vertically spaced openings and arranged for disposition on one side of said chain, a fixed support arm disposed on the opposite side of said chain to hold a side link of said chain against movement during a pressing stroke of said rod, said arm having openings spaced for coaxial location with respect to the openings in said head member, upper and lower head bars extending transversely of said track and rigidly connecting said head member with said support arm, said bars having end portions of reduced diameter arranged for snug reception in said openings of the head member and support arm and having shoulders adapted to seat against said member and said arm in locating relationship, the lower of said head bars being threaded at its end, nuts threaded onto said lower head bar for urging said member and said arm into abutting relationship with said shoulders to provide rigid relationship therebetween, the upper of said head bars being threaded adjacent said head member and the lower of said head bars being threaded adjacent said arm, a movable support arm having spaced openings therein for reception of said head bars, said arm being adapted to slide on said bars between adjusted positions dependent upon the width of a track chain, a portion of said movable arm being disposed between the said links of said chain to hold the other side link thereof during said pressing stroke, and nuts engaging the threaded portion of said upper head bar and the last mentioned threaded portion of said lower head bar for holding said movable support arm in adjusted position.

10. The combination recited in claim 9 wherein said movable support arm has a slotted opening in one end thereof adapted to seat over the pins and bushings of a chain, and wherein means are provided on opposite sides of the arm adapted to rest against the side links of the chain to align the pins, bushings and links with respect to said push rod, to locate the chain for a pressing stroke, said means being adjustable for different sizes of chains.

JOHN HERBERT ABRAMSON.
EDWIN C. SWANSON.